US012208738B2

(12) United States Patent
Schenk et al.

(10) Patent No.: US 12,208,738 B2
(45) Date of Patent: Jan. 28, 2025

(54) METHOD FOR DISPLAYING A VIRTUAL VIEW OF THE AREA SURROUNDING A VEHICLE, COMPUTER PROGRAM, CONTROL UNIT, AND VEHICLE

(71) Applicant: Robert Bosch GmbH, Stuttgart (DE)

(72) Inventors: Friedrich Schenk, Schwieberdingen (DE); Raphael Cano, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 18/061,336

(22) Filed: Dec. 2, 2022

(65) Prior Publication Data
US 2023/0191998 A1    Jun. 22, 2023

(30) Foreign Application Priority Data
Dec. 22, 2021    (DE) ..................... 10 2021 214 952.9

(51) Int. Cl.
*B60R 1/23*    (2022.01)
*G06T 7/80*    (2017.01)
(Continued)

(52) U.S. Cl.
CPC ............... *B60R 1/23* (2022.01); *G06V 20/56* (2022.01); *B60R 2300/10* (2013.01); *B60R 2300/30* (2013.01)

(58) Field of Classification Search
CPC ... B60R 1/23; B60R 2300/10; B60R 2300/30; G06V 20/58; G06V 20/64; G06T 7/80; G06T 15/205
See application file for complete search history.

(56) References Cited

U.S. PATENT DOCUMENTS

| 8,723,959 B2 | 5/2014 | Corcoran et al. |
| 2012/0236287 A1* | 9/2012 | Lee ........................... G06T 7/55 356/4.01 |

(Continued)

FOREIGN PATENT DOCUMENTS

| DE | 102014206246 A1 | 10/2015 |
| DE | 102014110516 A1 | 1/2016 |

(Continued)

OTHER PUBLICATIONS

Zhang et al., "Image Super-Resolution by Neural Texture Transfer," 2019 IEEE/CVF Conference on Computer Vision and Pattern Recognition (CVPR), 2019, pp. 7982-7991. <https://openaccess.thecvf.com/content_CVPR_2019/papers/Zhang_Image_Super-Resolution_by_Neural_Texture_Transfer_CVPR_2019_paper.pdf> Downloaded Dec. 2, 2022.

*Primary Examiner* — Brian P Yenke
(74) *Attorney, Agent, or Firm* — NORTON ROSE FULBRIGHT US LLP; Gerard A. Messina

(57) ABSTRACT

A method for displaying a virtual view of the area surrounding a vehicle, in particular a surround view or panoramic view. The method comprises: capturing a camera image of a part of the surroundings using a camera having a wide-angle lens; ascertaining an item of image information dependent on the captured camera image, the captured camera image being geometrically corrected; and displaying the virtual view by projecting the ascertained item of image information onto a virtual projection plane. When ascertaining the item of image information, the resolution of the geometrically corrected camera image is increased in a first partial region.

19 Claims, 6 Drawing Sheets

(51) Int. Cl.
    *G06T 15/20*     (2011.01)
    *G06V 20/56*     (2022.01)
    *G06V 20/58*     (2022.01)
    *G06V 20/64*     (2022.01)

(56) References Cited

U.S. PATENT DOCUMENTS

| | | | |
|---|---|---|---|
| 2015/0178884 A1* | 6/2015 | Scholl | G06T 7/33 |
| | | | 382/104 |
| 2018/0160052 A1* | 6/2018 | Aihara | G02B 3/02 |
| 2018/0232851 A1* | 8/2018 | Scholl | G06T 3/047 |
| 2019/0061624 A1* | 2/2019 | Katsumata | H04N 7/18 |
| 2019/0202356 A1* | 7/2019 | Cano | H04N 23/698 |
| 2019/0325580 A1* | 10/2019 | Lukac | G06T 3/4038 |
| 2020/0125864 A1* | 4/2020 | Hirano | G06V 20/58 |
| 2020/0134396 A1* | 4/2020 | Porta | G06V 20/588 |
| 2020/0410254 A1* | 12/2020 | Pham | G06V 10/454 |
| 2021/0160437 A1* | 5/2021 | Higuchi | G06F 18/2163 |
| 2023/0025209 A1* | 1/2023 | Binder | B60R 1/27 |
| 2023/0162468 A1* | 5/2023 | Aoki | G06V 10/50 |
| | | | 382/103 |
| 2023/0234503 A1* | 7/2023 | Eki | G06V 20/56 |
| | | | 348/373 |
| 2024/0005461 A1* | 1/2024 | Eliazov | G06V 20/597 |
| 2024/0015269 A1* | 1/2024 | Ikari | B60R 1/26 |
| 2024/0104897 A1* | 3/2024 | Kale | G06V 20/58 |

FOREIGN PATENT DOCUMENTS

| | | |
|---|---|---|
| DE | 102019219017 A1 | 6/2021 |
| DE | 102020106967 A1 | 9/2021 |

* cited by examiner

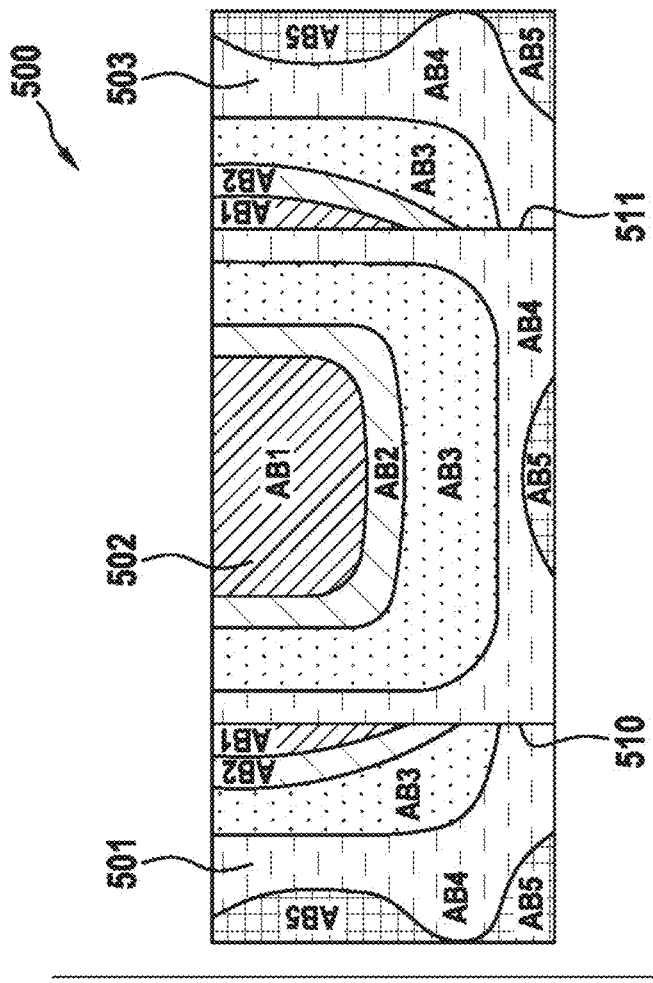
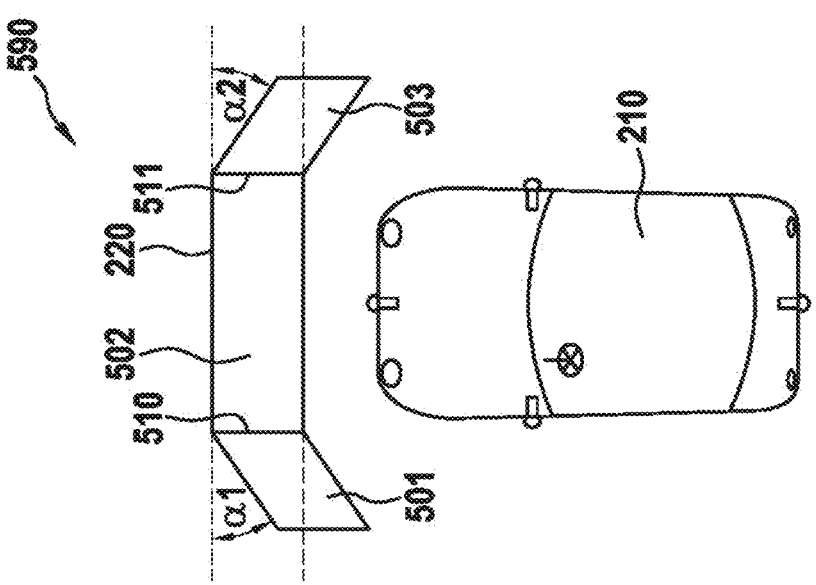
Fig. 6

METHOD FOR DISPLAYING A VIRTUAL VIEW OF THE AREA SURROUNDING A VEHICLE, COMPUTER PROGRAM, CONTROL UNIT, AND VEHICLE

CROSS REFERENCE

The present application claims the benefit under 35 U.S.C. § 119 of German Patent Application No. DE 10 2021 214 952.9 filed on Dec. 22, 2021, which is expressly incorporated herein by reference in its entirety.

FIELD

The present invention relates to a method for displaying a virtual view of an area surrounding a vehicle for a user of the vehicle. The present invention also relates to a computer program, comprising commands that, when the program is executed by a computer, cause said computer to execute the steps of the method. The present invention furthermore relates to a control unit with a computing unit that is configured in such a way that it executes the steps of the method. The present invention furthermore relates to a vehicle including this control unit.

BACKGROUND INFORMATION

German Patent Application No. DE 10 2019 219 017 A1 describes a display method for illustrating a surroundings model of a vehicle using for example four vehicle cameras, each including a wide-angle lens system.

U.S. Pat. No. 8,723,959 B2 describes a method for improving a scene.

Zhang et al. (2019), in the document "Image Super-Resolution by Neural Texture Transfer" in Computer Vision and Pattern Recognition (cs.CV) (arXiv:1903.00834 [cs.CV]), describe a reference-based method for restoring image information in low resolution images.

An object of the present invention is to improve a display of a surroundings model of a vehicle.

SUMMARY

The above object may be achieved according to the present invention.

The present invention relates to a method for displaying a virtual view of the area surrounding a vehicle for a user of the vehicle, in particular a surround, top-down, or panoramic view. According to an example embodiment of the present invention, in a first step of the method, at least one camera image of a part of the surroundings is captured using a camera of the vehicle having a wide-angle lens. Preferably a sequence of camera images of the part of the surroundings is captured using the camera. Advantageously, at least four camera images or sequences of camera images are captured using different vehicle cameras. The at least one camera comprises a wide-angle lens. Preferably each of the cameras comprises a wide-angle lens. The different cameras are advantageously arranged around the vehicle and advantageously capture the area surrounding the vehicle from various viewing directions or perspectives, with the capture regions of adjacent cameras advantageously overlapping. Then an item of image information is ascertained dependent on the at least one currently captured camera image, with the captured camera image being geometrically corrected and the resolution or pixel density of the geometrically corrected camera image being increased in at least a first partial region. The geometric correction of the captured camera image results in differences in resolution or pixel density in the geometrically corrected camera image: for example, the central region of the geometrically corrected camera image has a higher resolution or pixel density compared with the edge regions of the geometrically corrected camera image. In a preferred configuration of the invention, the first partial region consequently represents in particular an edge region of the captured camera image. The first partial region is advantageously a coherent or non-coherent region of the geometrically corrected camera image that may for example have a resolution or pixel density of less than or equal to half the resolution or half the pixel density of the central region. The first partial region preferably comprises at least two non-coherent regions that lie to the right and left of the central region. The increase in the resolution of the first partial region is performed in particular by a first learned machine recognition method, advantageously by a first deep neural network (CNN) that represents in particular a super-resolution technique. Then the virtual view is displayed by projecting the ascertained item of image information onto a virtual projection plane. The method has the advantage that the virtual view for the user is illustrated more sharply and with higher contrast in the first partial region, since an estimation of the initially missing item of image information in the first region takes place. In other words, advantageously unsharpness of the item of image information in the first partial region resulting from geometric deskewing of the camera image captured using a wide-angle lens system is reduced by a determination, in particular estimation, of the item of image information initially missing in the first partial region, as a result of which the view is clearer and more realistic for the user. The method harmonizes or brings into line in particular differences in resolution in the geometrically corrected or geometrically transformed camera image: in particular, advantageously image contents illustrated in the edge region of the captured camera image are illustrated in a more error-free manner, such as a roadway substrate close to the vehicle, roadway textures, for example the nature of the ground, or patterns in the road surface, or highway markings, for example parking space boundary lines.

Optionally, according to an example embodiment of the present invention, the increase in the resolution or the pixel density of the geometrically corrected camera image in the first partial region is first increased in the x direction or horizontal direction, and then in the y direction or vertical direction. This yields the advantage that very small differences in resolution or pixel density result in the displayed virtual view.

Optionally, according to an example embodiment of the present invention, the increase in the resolution or the pixel density of the geometrically corrected camera image is carried out in particular in the joining regions or at joining lines between displayed camera images of different cameras. In other words, the first partial region comprises in particular the joining region, which in the displayed virtual view lies between the camera images of different cameras or joins them together. This joining region is typically produced by averaging the two overlapping camera images. This optional variant illustrates the virtual view, which comprises at least two camera images of different cameras, more clearly and in a less error-full manner, in particular in the joining region.

In one advantageous embodiment of the present invention, the image content of the first partial region represents a position relative to the vehicle of less than or equal to a specified distance. Preferably the first partial region thus comprises only the lower regions of the geometrically corrected camera image lying to the right and left of the central region, the item of image information or image content of which represents a position relative to the vehicle smaller than a specified distance. This specified distance from the vehicle may optionally be adapted dependent on captured distance data between the vehicle and objects in the surroundings, dependent on a vehicle speed, and/or dependent on a brightness of the camera image, for example the average brightness of the captured camera image or of the geometrically corrected camera image, and/or dependent on a contrast of the camera image, for example the average contrast of the captured camera image or the geometrically corrected camera image. The distance data may be captured for example using the cameras by a structure-from-motion method and/or using at least one optional ultrasonic sensor and/or an optional radar sensor and/or an optional lidar sensor. In this variant, the first partial region is advantageously limited, and the required computing power for increasing the resolution is reduced.

According to an example embodiment of the present invention, preferably the first partial region, after the geometric correction of the captured camera image, has a pixel density or resolution of less than or equal to a lower threshold value. The first partial region can be ascertained dependent on the pixel density after the geometric correction of the captured camera image and on the lower threshold value and/or the specified distance. Alternatively or additionally, the first partial region is advantageously adapted dependent on a vehicle speed, dependent on an ascertained, in particular average, brightness of the captured camera image, and/or dependent on an ascertained, in particular average, contrast, in particular in the first partial region, of the captured camera image. In other words, the first partial region can advantageously be varied or adapted dependent on the vehicle speed, and/or for example the contrast in the captured camera image, with for example the specified distance and/or the lower threshold value being adapted using these dependencies. This configuration reduces the area of the first partial region in particular if perceptible unsharpness has not been ascertained or is not to be expected, for example at high vehicle speeds or in the case of low brightness. The first partial region is advantageously enlarged if a perceptible unsharpness has been ascertained or is to be expected, for example at low vehicle speeds or in the case of high contrast in the captured camera image. In this configuration, there also results the advantage that the first partial region is advantageously limited and the required computing power or the power consumption for increasing the resolution is reduced.

In a particularly preferred variant, the first learned machine recognition method or the deep neural network is adapted, or selected or ascertained, dependent on a recognized object and/or a recognized segment in the first partial region. The adaptation relates for example to weighting or to a change in the output result. The neural network used for increasing the resolution in the first partial region is selected or ascertained for example dependent on a roadway representation, grassy area representation, or building representation recognized in the first partial region, with the different first learned machine recognition methods or neural networks preferably each being specifically trained to increase the resolution relative to the segment contents recognized in each case, for example to increase the resolution of roadway regions or grassy areas. As a result, the missing image content of the first partial region in the geometrically corrected camera image is advantageously estimated particularly well when increasing the resolution, so that a high quality of the estimated image content results, which for example also results in greater sharpness of the first partial region in the virtual view displayed.

In a particularly preferred refinement of the present invention, a respective resolution of the geometrically corrected camera image in at least two regions of the first partial region that are different from each other may be increased by first learned machine recognition methods that are different from each other. The regions of the first partial region that are different from each other may represent different resolutions or pixel densities, the different first learned machine recognition methods representing different factors for upscaling the resolution. In other words, the different first learned machine recognition methods are trained to produce a different increase or scaling of the resolution or pixel density. In this refinement, a more homogeneous resolution over the entire image region of the geometrically corrected camera image is produced, as a result of which the displayed virtual view of the surroundings appears more realistic and is improved efficiently.

Further, in one optional development of the present invention, the resolution of the geometrically corrected camera image may be reduced in at least a second partial region of the geometrically corrected camera image, the second partial region, after the geometric correction of the captured camera image, having in particular a pixel density of greater than or equal to an upper threshold value. The second partial region advantageously represents a central region of the captured camera image. In this refinement, likewise advantageously a more homogeneous resolution over the entire image region of the geometrically corrected camera image is produced, as a result of which the displayed virtual view of the surroundings appears more realistic or is improved.

According to an example embodiment of the present invention, preferably the resolution of the second partial region can be reduced by a second learned machine recognition method, or by downsampling.

Furthermore, the resolution of the geometrically corrected camera image in the first and/or second partial region may additionally be adapted dependent on captured or ascertained distance data between the vehicle and objects in the area surrounding the vehicle. As a result, for example particularly high resolutions of the recognized objects in the virtual view are produced if these are at a distance from the vehicle that is smaller than a threshold value, or are captured or recognized in the close range around the vehicle.

In a preferred optional configuration of the method according to the present invention, the resolution of the geometrically corrected camera image in the first partial region is additionally increased dependent on at least one reference region. Advantageously, the resolution of the geometrically corrected camera image in the first partial region is additionally increased dependent on at least two reference regions, the reference regions preferably being arranged or lying in different camera images of the vehicle camera. Alternatively or additionally, the resolution of the geometrically corrected camera image is optionally reduced in the second partial region dependent on the at least one reference region. The reference region lies in particular outside of the first and/or second partial region(s). The reference region may lie in the captured camera image, in the geometrically corrected camera image, or in another camera image, the other camera image having been captured using another vehicle camera. The other camera image in this case preferably has a region of intersection with the captured camera image. Alternatively or additionally, the reference region may lie in a stored camera image, with the stored camera image being stored in an electronic memory of the vehicle or on a server device, and being retrieved or loaded, for example dependent on the vehicle position. In one refinement, for example, two reference regions may be present, or the reference region may comprise a first reference region and a second reference region. The first reference region lies for example in the geometrically corrected camera image in a central region of the camera image of high resolution after the geometric correction, this first reference region preferably forming an image content with a distance from the vehicle of less than or equal to a reference distance. The second reference region lies for example in another geometrically corrected camera image from another vehicle camera, captured at least virtually simultaneously, the other camera image preferably having a region of intersection with the captured camera image. The reference region is ascertained in particular dependent on a recognized object and/or a recognized segment, for example a recognized road surface as segment, in the geometrically corrected camera image. In this configuration, the advantage is produced that the virtual view is illustrated more sharply and with higher contrast for the user in the first and/or second partial region. In this variant there is advantageously a template for estimating the item of image information in relation to the resolution that is increased after the geometric correction, in particular by a deep neural network, as a result of which the displayed virtual view is displayed particularly realistically, with high contrast, and sharply.

The present invention also relates to a computer program, comprising commands that, when the program is executed by a computer, cause said computer to execute the steps of the method according to the present invention.

The present invention also relates to a control unit. The control unit has at least one signal input for providing a first signal that represents at least one camera image captured using a camera with a wide-angle lens. In particular, the first signal represents a sequence of camera images captured using the camera with a wide-angle lens. The control unit furthermore comprises a signal output for outputting a control signal for an indication device, in particular a display, the control signal representing a virtual view of the area surrounding a vehicle. The control unit further has a computing unit, in particular a processor. The computing unit is configured such that it executes the steps of the method according to the present invention.

The present invention furthermore relates to a vehicle, comprising at least one camera, wherein the camera comprises a wide-angle lens and is equipped to capture at least one camera image or a sequence of camera images of a part of the area surrounding the vehicle. The vehicle also comprises the control unit according to the present invention.

Further advantages of the present invention will become apparent from the following description of exemplary embodiments of the present invention with reference to the figures.

BRIEF DESCRIPTION OF THE DRAWINGS

FIG. 6 shows pixel density map for a panoramic view, according to an example embodiment of the present invention.

DETAILED DESCRIPTION OF EXAMPLE EMBODIMENTS

Figure 1:
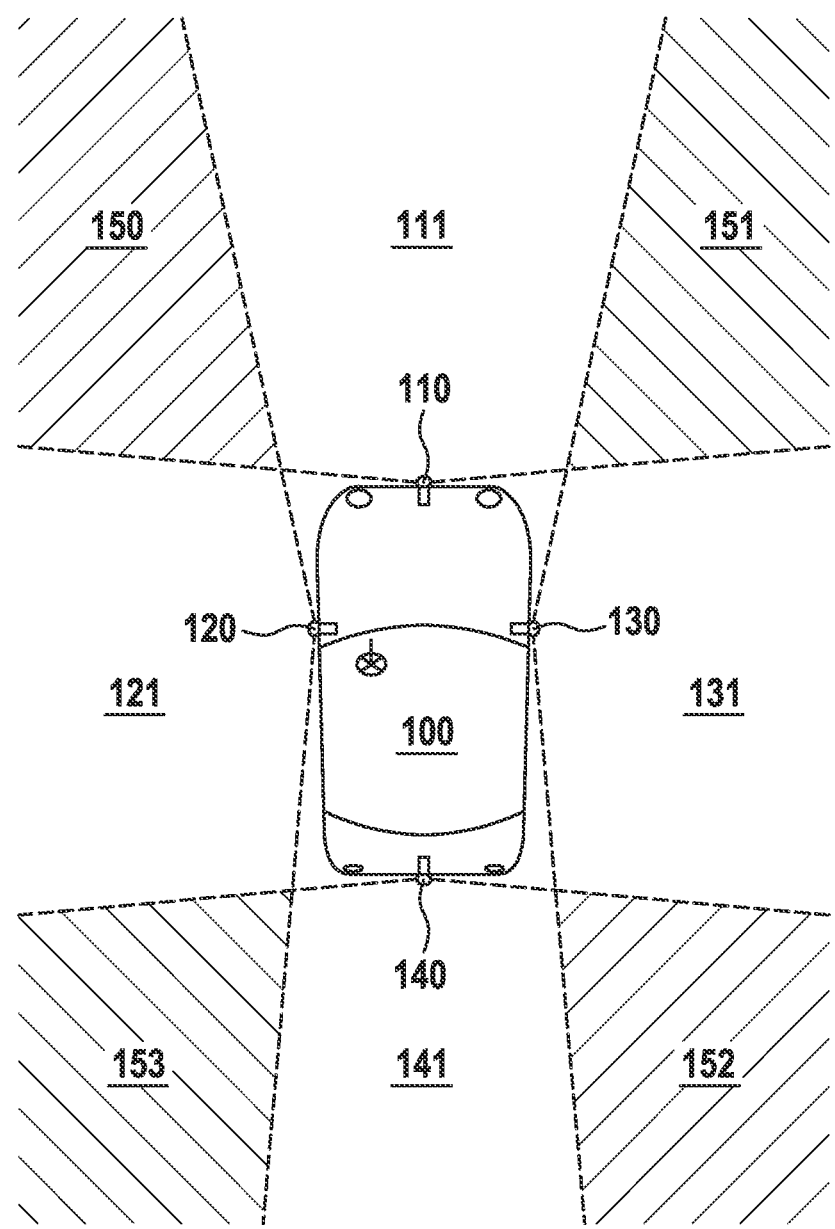
FIG. 1 shows a vehicle with a camera having a wide-angle lens, according to an example embodiment of the present invention.

FIG. 1 schematically illustrates a vehicle 100 with a camera 110 having a wide-angle lens. In this example, the vehicle 100 furthermore comprises, in addition to the (first) camera 110, which here, by way of example, is arranged centrally on the front of the vehicle 100, and might alternatively be arranged for example on the rear of the vehicle, a second camera 120 on the left-hand side of the vehicle, a third camera 130 on the right-hand side of the vehicle, and a fourth camera 140 on the rear of the vehicle. Each of the cameras 110, 120, 130 and 140 comprises a wide-angle lens in each case, and is furthermore equipped to capture at least one camera image, in particular a sequence of camera images, of a respective partial region of the area surrounding the vehicle 100. The first camera 110 captures a first capture region 111 or first partial region of the surroundings. The second camera 120 captures a second capture region 121 or second partial region of the surroundings. The third camera 130 captures a third capture region 131 or third partial region of the surroundings. The fourth camera 140 captures a fourth capture region 141 or fourth partial region of the surroundings. The four cameras 110, 120, 130, 140 are equipped to capture camera images of the partial regions of the area surrounding the vehicle 100 that together map the area surrounding the vehicle 100 virtually completely. The capture regions 111, 121, 131 and 141 intersect with each other in each case, or overlap with the respective two capture regions of adjacent cameras in each case. The vehicle 100 may have, in addition to the four camera sensors or cameras 110, 120, 130 and 140, further cameras and/or further sensors (not shown in FIG. 1), for example at least one ultrasonic sensor, a radar sensor and/or a lidar sensor. In particular, the vehicle 100 comprises, on the front and on the rear of the body of the vehicle 100, ultrasonic sensors for capturing distance data between the vehicle 100 and objects in the surroundings, or for recognizing objects located close by in the area surrounding the vehicle.

Figure 2:
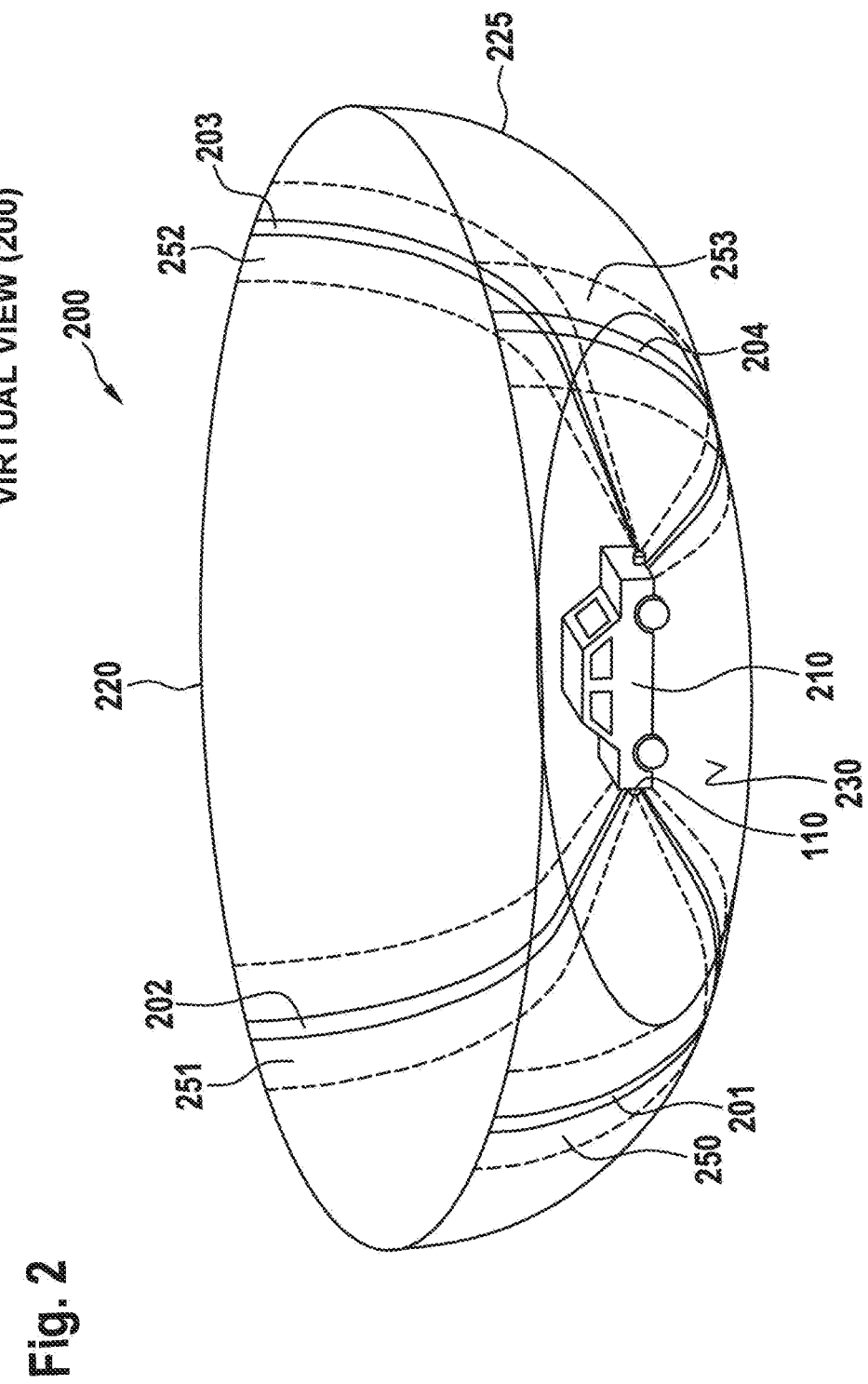
FIG. 2 shows display example for a virtual view, according to an example embodiment of the present invention.

FIG. 2 schematically illustrates a surround view as a virtual view 200, as can be displayed to the user of the vehicle 100 using an indication device or a display. The virtual view 200 illustrated in FIG. 2 schematically shows a so-called bowl model from an elevated bird's eye perspective obliquely from above. The vehicle 100 is typically illustrated as a three-dimensional model 210 in a bowl-shaped projection plane 220 that typically has a flat base area 230. The projection plane 220 may alternatively be for example box-shaped, that is to say the side walls 225 as a rule are flat in the case of a box-shaped projection plane 220. The side walls 225 may be deformed or displaced dependent on captured objects in the close range of the vehicle 100, for example in the region of the flat base area 230. The captured camera images, once captured, are advantageously geometrically corrected or geometrically transformed or deskewed, for example using a transformation matrix. The deskewed camera images of the cameras 110, 120, 130 and 140 are then projected or mapped onto the projection plane, for example the first camera image of the first camera 110 and the second camera image of the second camera 120, there typically being fixed associations between pixel coordinates of the deskewed camera images and the grid coordinates of the projection plane. The region of overlap 150 mapped by the first and second camera images is illustrated in the surroundings model as a region of intersection 250 between the first and second camera images. The region of intersection 250 has a seam region 201 or a first seam region. The seam region 201 illustrates or represents the, in particular direct, joining line between the first and second camera images. The region of overlap 153 mapped by the second and fourth camera images is illustrated in the surroundings model as a fourth region of intersection 253 between the second and fourth camera images. The fourth region of intersection 253 has a fourth seam region 204. The fourth seam region 204 illustrates or represents the joining line between the second and fourth camera images. The region of overlap 151 mapped by the first and third camera images is illustrated in the surroundings model as a second region of intersection 251 between the first and third camera images. The second region of intersection 251 has a second seam region 202. The second seam region 202 illustrates or represents the joining line between the first and third camera images. The region of overlap 152 mapped by the third and fourth camera images is illustrated in the surroundings model as a third region of intersection 252 between the third and fourth camera images. The third region of intersection 252 has a third seam region 203. The third seam region 203 illustrates or represents the joining line between the third and fourth camera images. The seam regions 201, 202, 203, 204, in particular within the respective regions of intersection 250, 251, 252, 253, may be displaced, dependent on captured or recognized objects close to the vehicle 100, in the area surrounding the vehicle 100, thus avoiding the seam region 201, 202, 203, 204 being cut through by the captured or recognized object. This advantageously reduces image artifacts. The seam regions 201, 202, 203, 204 advantageously extend at least over the base area 230, and alternatively or additionally over the side walls 225 of the projection plane 220. The seam regions 201, 202, 203, 204 or the regions of intersection 250, 251, 252, 253 are advantageously concealed by alpha blending or an increasing or decreasing transparency gradient of the camera images that overlap in each case, so that these regions are less noticeable to the user or to the driver of the vehicle.

Figure 3:
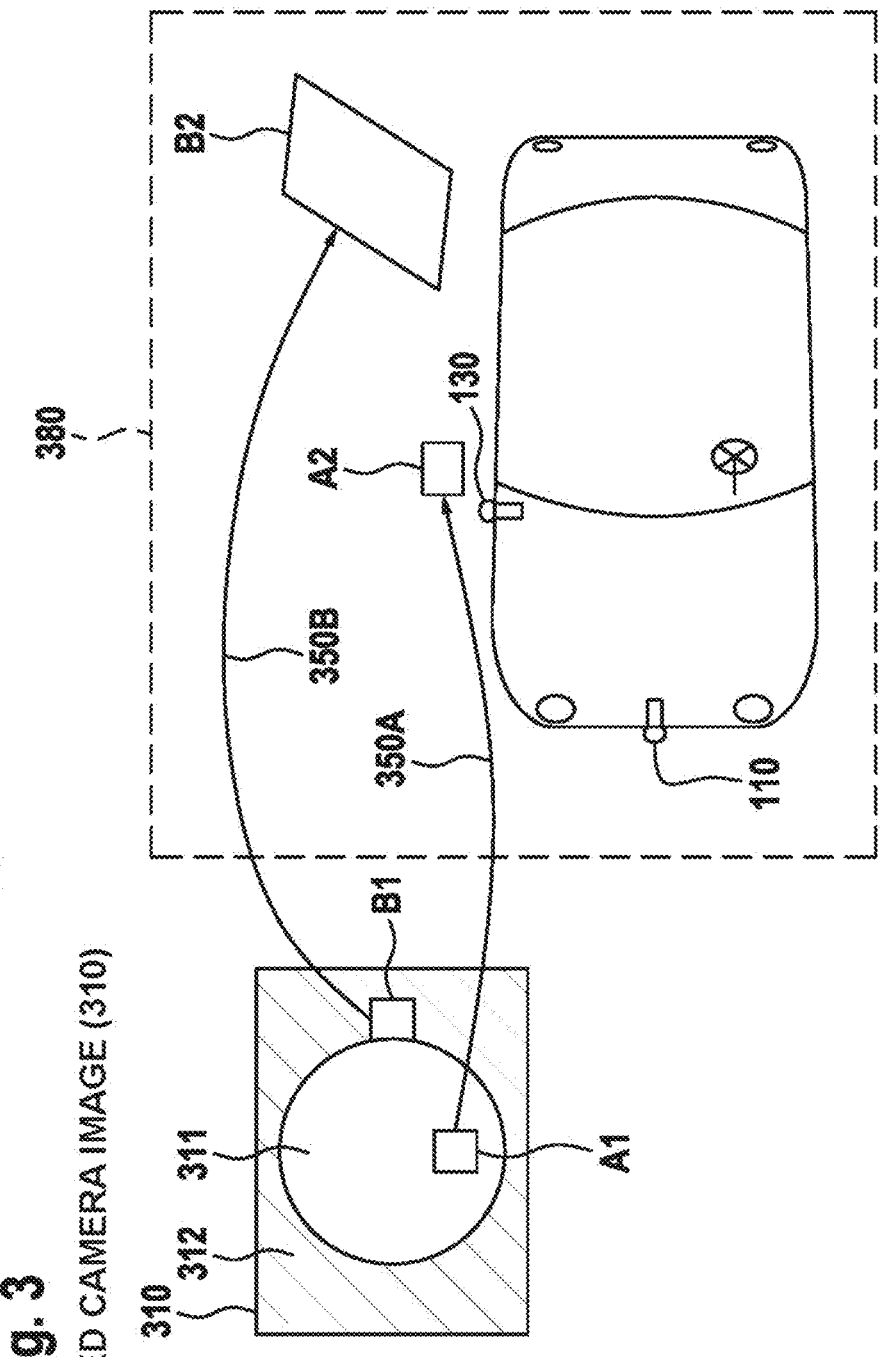
FIG. 3 shows a diagram of the geometric correction, according to an example embodiment of the present invention.

FIG. 3 schematically illustrates a geometric correction of a skewed camera image 310, captured using a wide-angle lens, of the camera 130 of FIG. 1, with the example corresponding to a geometric correction of a skewed camera image 310, captured using a wide-angle lens, of the camera 110, or being independent of the direction of viewing of the camera 110, 120, 130 or 140. The optical system of the wide-angle lens of the camera(s) 110, 120, 130 and/or 140 is known. In addition to the captured camera image 310, in FIG. 3 a detail 380 of the virtual view 200 from a top-down perspective or a bird's eye perspective is represented perpendicularly from above, the detail 380 representing the model 210 of the vehicle 100 and part of the base area 230 lying around the vehicle 100. Owing to the known optical system of the camera, a geometric correction of the captured camera image 310 can be carried out. For example, a geometric correction 350A of the image region A1 of the captured camera image 310 and a geometric correction 350B of the image region B1 of the captured camera image 310 are performed. The geometric correction 350A ascertains or transforms an item of image information A2 in relation to the image region A1, with the ascertained item of image information A2 then being projected onto the virtual projection plane 220. The geometric correction 350B ascertains or transforms an item of image information B2 in relation to the image region B1 of the captured camera image 310, the ascertained item of image information B2 then likewise being projected onto the virtual projection plane 220. It can be inferred from FIG. 3 that different area sizes of the items of image information A2 and B2 ascertained by the geometric correction result. In other words, the edge regions 312 of the captured camera image 310 that are geometrically skewed in relation to the illustrated image content are more greatly stretched or deskewed compared with the central region 311 of the camera image 310 by the geometric correction, since the captured camera image has lesser geometric skewing in the central region compared with the edge region 312. The geometric correction of the camera image 310 captured using a wide-angle lens system results in deskewed items of image information in the virtual view that are intuitively readily comprehensible to the user, but thus also different pixel densities or resolutions in the virtual view displayed. These differences in resolutions appear to the user for example as local unsharpness and/or local deviations in contrast.

Figure 4:
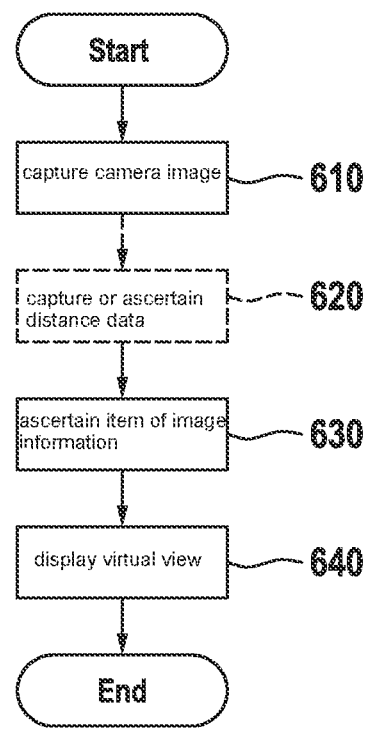
FIG. 4 shows a sequence of the method as a block diagram, according to an example embodiment of the present invention.

FIG. 4 schematically illustrates a sequence of the method for displaying a virtual view, in particular a surround view or panoramic view, as a block diagram, the virtual view visualizing or displaying the area surrounding the vehicle to a user of the vehicle. In a first step 610, at least one camera image 310 of a part of the surroundings is captured using at least one camera 110, 120, 130 and/or 140 with a wide-angle lens. Optionally, in step 620 distance data may be captured or ascertained, for example using the at least one optional ultrasonic sensor, the optional radar sensor, and/or the optional lidar sensor of the vehicle. Then in step 630 an item of image information is ascertained dependent on the captured camera image, the captured camera image first of all being geometrically corrected. After the geometric correction, when ascertaining 630 the item of image information, the resolution of the geometrically corrected camera image is increased in a first partial region, in particular by a first learned recognition method or neural network that has been trained to estimate image contents when increasing resolution. The first partial region, after the geometric correction of the captured camera image, advantageously has a pixel density of less than or equal to a lower threshold value. The image content of the first partial region in this case preferably represents a position relative to the vehicle of less than or equal to a specified distance. The first learned machine recognition method is adapted or selected in particular dependent on a recognized object and/or a recognized segment in the first partial region. Optionally, when ascertaining 630 the item of image information the respective resolution of the geometrically corrected camera image in at least two regions of the first partial region that are different from each other is increased by first learned machine recognition methods that are different from each other. Furthermore, in step 630 the resolution of the geometrically corrected camera image may be reduced in at least a second partial region. The resolution of the second partial region is reduced in particular by a second learned machine recognition method, or by downsampling. In step 630 the resolution in the first and/or second partial region is advantageously adapted additionally dependent on captured or ascertained distance data between the vehicle and objects in the area surrounding the vehicle. In a particularly preferred embodiment, the resolution of the geometrically corrected camera image in the first partial region and/or the resolution of the geometrically corrected camera image in the second partial region is additionally increased or lowered dependent on at least one reference region. In a further step 640, the virtual view 200 is displayed by projecting the ascertained item of image information onto a virtual projection plane 220.

Figure 5:
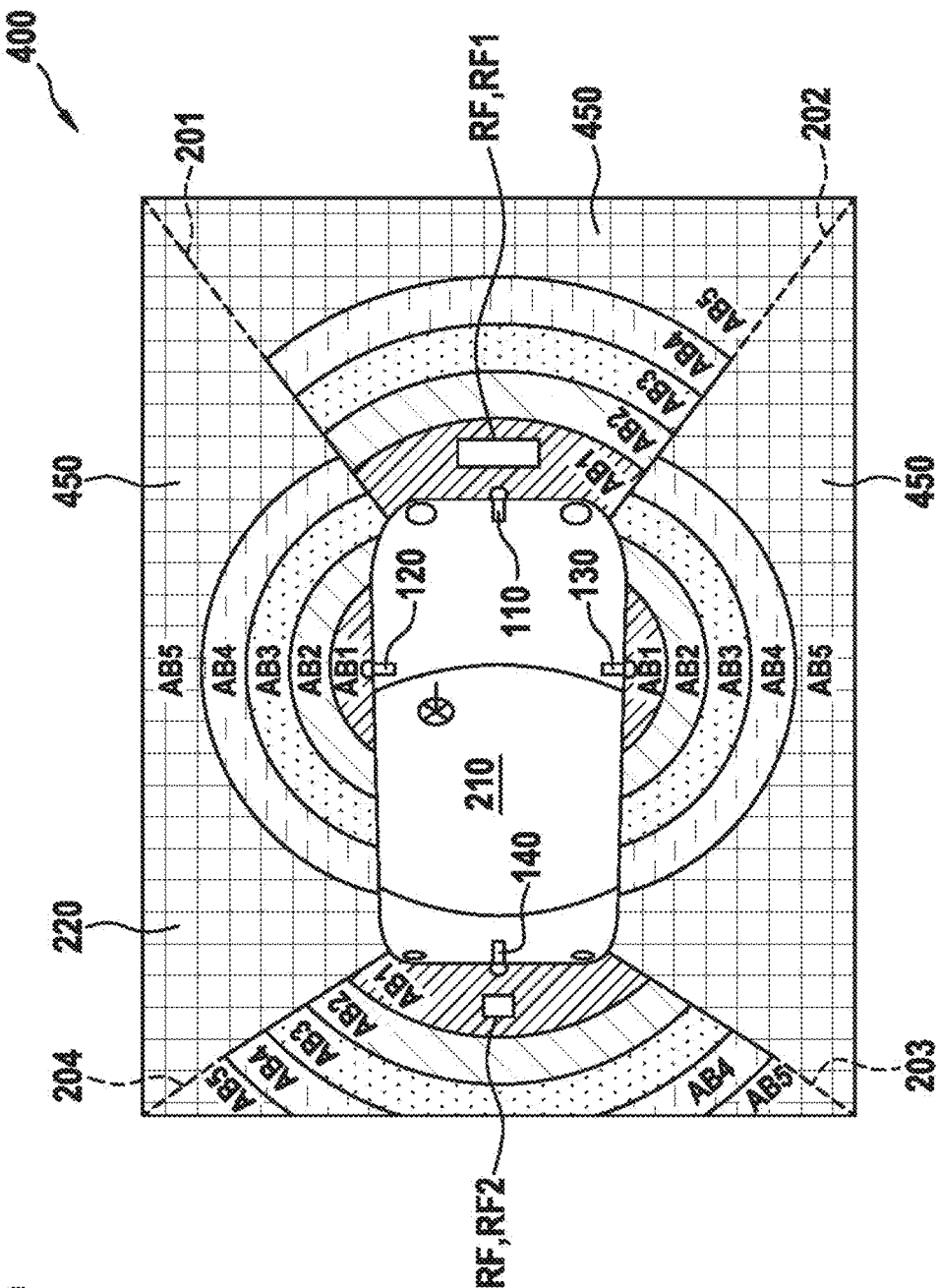
FIG. 5 shows a pixel density map for a top-down view, according to an example embodiment of the present invention.

FIG. 5 illustrates a detail 400 of a pixel density map resulting from the geometric correction, or a resulting resolution distribution in relation to a top-down view of a bowl-shaped projection plane 220 as a virtual view, the detail 400 of the pixel density map for better comprehension comprising the three-dimensional model 210 of the virtual view 200. In other words, FIG. 5 represents the pixel density without any increase in the resolution of the geometrically corrected camera image. The pixel density map is illustrated schematically in FIG. 5: the detail 400 comprises different pixel density or resolution regions. The detail comprises for example resolution regions AB1 of very high resolution or pixel density (with dark hatching) greater than or equal to a first resolution threshold value RTV1, resolution regions AB2 of high resolution (with light hatching) greater than or equal to a second resolution threshold value RTV2, resolution regions AB3 (dotted) of medium resolution greater than or equal to a third resolution threshold value RTV3, resolution regions AB4 of low resolution (in transverse broken lines) greater than or equal to a fourth resolution threshold value RTV4, and resolution regions AB5 (checked pattern) of very low resolution less than or equal to the fourth resolution threshold value RTV4. In FIG. 5, furthermore the seam regions or joining lines 201, 202, 203, 204 between the camera images of different adjacent cameras can be recognized, since strong gradients relating to the resolution between the adjoining geometrically corrected camera images in each case may be present on these, and may be particularly noticeable to the user. In the detail 400 of the pixel density map or resolution distribution in relation to the virtual view 200 from the top-down view illustrated in FIG. 5, considerable differences in pixel density or resolution and regions with locally strong gradients or resolution steps, in particular at the joining lines 201 through 204, can consequently be recognized, with the differences in resolution and resolution steps creating perceptible unsharpness of the displayed item of image information for the user in the virtual view, in particular at the joining lines and in the resolution region AB4 of low resolution and/or the resolution region AB5 of very low resolution. In other words, in the virtual view 200 in the resolution regions AB4 and/or AB5 without an increase in the resolution in the virtual view perceptible unsharp items of image information result for the user. In order to avoid these impressions of unsharpness, the resolution is increased in a first partial region of the geometrically corrected camera image, with the item of image information ascertained in the first partial region to increase the resolution being ascertained in particular by a neural network. The first partial region 450 in this case comprises at least the resolution region AB5 of a geometrically corrected camera image. Advantageously, the first partial region 450 comprises the resolution regions AB5 of very low resolution of all the geometrically corrected camera images captured using the cameras 110, 120, 130 and 140. Particularly preferably, the first partial region 450 additionally comprises at least the resolution region AB4 of low resolution and optionally the resolution region AB3 of the geometrically corrected camera image of medium resolution. Advantageously, the first partial region 450 comprises the resolution regions AB3, AB4 and AB5 of very low to medium resolution of all the geometrically corrected camera images captured using the cameras 110, 120, 130 and 140. The neural network is equipped to ascertain or produce the item of image information missing from the geometrically corrected camera image in the first partial region to increase the resolution, with the neural network estimating the item of image information based on learned images of similar driving situations. The item of image information may additionally be ascertained dependent on a reference region RF, with the reference region RF lying for example in the resolution region AB1 of the geometrically corrected camera image of the camera(s) 110, 120, 130 and/or 140. The reference region RF may for example comprise a partial reference region or first reference region RF1 that lies in the resolution region AB1 and/or AB2 of high and/or very high resolution of the camera image captured and geometrically corrected using the camera 110, and another, further, partial reference region or second reference region RF2 that lies in the resolution region AB1 and/or AB2 of high and/or very high resolution of the camera image captured and geometrically corrected using the camera 140. The neural network, when ascertaining or estimating the item of image information, takes into account the reference region or the partial reference regions, as a result of which the item of image information is ascertained better, i.e. more sharply or more realistically for the user. The first partial region may be determined or adapted dependent on captured distance data between the vehicle and objects in the area surrounding the vehicle, and/or dependent on odometry data of the vehicle, such as the vehicle speed, and/or dependent on the brightness in the captured camera image, and/or dependent on the contrast of the captured camera image. For example, the first partial region at high speeds comprises only the resolution region AB5 of very low resolution of the forward oriented camera image captured using the camera 110, whereas the first partial region at low speeds comprises the resolution regions AB3, AB4 and AB5 of all the camera images captured using the cameras 110, 120, 130 and 140. Optionally, when ascertaining the item of image information, the respective resolution of the geometrically corrected camera image in at least two regions of the first partial region that are different from each other may be increased by first learned machine recognition methods that are different from each other. For example, the resolution of the resolution region AB5 of very low resolution of the first partial region is ascertained by a first neural network, and the resolution of the resolution region AB4 of the first partial region of comparably lower resolution is ascertained by another first neural network, with the two first neural networks being trained for example to generate different scaling factors for the resolution. Furthermore, in step 630 the resolution of the geometrically corrected camera image may be reduced in at least a second partial region 460, the second partial region corresponding to or comprising for example the resolution regions AB1 and/or AB2. The resolution of the second partial region 460 is reduced in particular by a second learned machine recognition method, or by downsampling.

FIG. 6 illustrates a pixel density map 500 or resolution distribution in relation to a panoramic view 590, resulting from the geometric correction, that is displayed for example to a driver dependent on a camera image captured using a rearward oriented camera 140. The projection plane 220 of the panoramic view 590 as a virtual view is schematically illustrated next to the mapped pixel density map 500 obliquely from above, with the driver typically having the projection plane 220 displayed to him from the front as a virtual view, i.e. without representing the vehicle model 210.

The projection plane 220 has for example three flat surfaces 501, 502 and 503 that are each arranged perpendicularly to the base area of the vehicle 100 or parallel to the vertical axis of the vehicle 100, with the left-hand area 501 and the right-hand area 503 having an angular offset a1 or a2 relative to the middle area 502. In other words, the left-hand area 501 intersects the middle area 502 at the section line 510, and the right-hand area 503 intersects the middle area 502 at the section line 511. Owing to the angular offset of the left-hand area 501 and right-hand area 503 relative to the middle area 502, based on the geometric correction in relation to the known optical system of the camera relative to an alternative larger flat projected area higher resolutions or pixel densities are produced on the left-hand area 501 and right-hand area 503, and thus the impression of unsharpness is already reduced beforehand; in particular, this increases the resolution or pixel density to the left of the section line 510 and to the right of the section line 511. In the pixel density map 500 or resolution distribution in relation to the panoramic view 590, nevertheless resolution regions as illustrated in FIG. 5 are present, i.e. resolution regions AB1 of very high resolution or pixel density (with dark hatching), resolution regions AB2 of high resolution (with light hatching), resolution regions AB3 (dotted) of medium resolution, resolution regions AB4 of low resolution (in transverse broken lines), and resolution regions AB5 (checked pattern) of very low resolution. Thus considerable differences in pixel density or resolution in the pixel density map 500 can be recognized, which result in impressions of unsharpness in the displayed virtual view for the user.

What is claimed is:

1. A method for displaying a virtual view of an area surrounding a vehicle, the virtual viewing being a surround view or panoramic view, the method comprising:
   capturing a camera image of a part of the surroundings using a camera having a wide-angle lens;
   ascertaining an item of image information dependent on the captured camera image, the captured camera image being geometrically corrected; and
   displaying the virtual view by projecting the ascertained item of image information onto a virtual projection plane;
   wherein, when ascertaining the item of image information, a resolution of the geometrically corrected camera image is increased in a first partial region using a learned machine recognition method,
   wherein the virtual projection plane is a bowl-shaped projection plane or a box-shaped projection plane, each of which have a flat base area, and
   wherein the camera image is geometrically transformed or de-skewed using a transformation matrix to obtain the geometrically corrected camera image.

2. The method as recited in claim 1, wherein image content of the first partial region represents a position relative to the vehicle of less than or equal to a specified distance.

3. The method as recited in claim 1, wherein the first partial region, after the geometric correction of the captured camera image, has a pixel density of less than or equal to a lower threshold value.

4. The method as recited in claim 1, wherein the first learned machine recognition method is adapted or selected dependent on an object recognized in the first partial region and/or a recognized segment.

5. The method as recited in claim 1, wherein a respective resolution of the geometrically corrected camera image, in at least two regions of the first partial region that are different from each other, is increased by first learned machine recognition methods that are different from each other.

6. The method as recited in claim 1, wherein a resolution of the geometrically corrected camera image is reduced in at least a second partial region.

7. The method as recited in claim 6, wherein the resolution of the second partial region is reduced by a second learned machine recognition method, or by downsampling.

8. The method as recited in claim 6, wherein the resolution in the first partial region and/or in the second partial region is additionally adapted dependent on captured or ascertained distance data.

9. The method as recited in claim 6, wherein the resolution of the geometrically corrected camera image in the first partial region and/or the resolution of the geometrically corrected camera image in the second partial region is additionally increased or decreased dependent on at least one reference region within different camera images.

10. The method as recited in claim 9, wherein the at least one reference region includes two reference regions.

11. The method as recited in claim 1, wherein when ascertaining the item of image information a respective resolution of the geometrically corrected camera image in at least two regions of the first partial region that are different from each other is increased by first learned machine recognition methods that are different from each other.

12. The method as recited in claim 1, wherein the de-skewed camera images are projected or mapped onto the projection plane, and wherein there are fixed associations between pixel coordinates of the de-skewed camera images and grid coordinates of the projection plane.

13. The method as recited in claim 1, wherein a resolution of the geometrically corrected camera image in the first partial region is increased dependent on at least two reference regions, the reference regions being arranged in different camera images of the vehicle camera.

14. The method as recited in claim 1, wherein seam regions within respective regions of intersection are displaceable, dependent on a captured object or a recognized object adjacent to the vehicle, in an area surrounding the vehicle, thus avoiding the seam regions being cut through by the captured object or the recognized object, so as to reduce image artifacts.

15. The method as recited in claim 1, wherein the seam regions extend at least over the flat base area, and/or over side walls of the projection plane.

16. The method as recited in claim 1, wherein the seam regions or the regions of intersection are concealed by alpha blending or an increasing or decreasing transparency gradient of the camera images that overlap in each case, so that the regions are less noticeable to a user or a driver of the vehicle.

17. A non-transitory computer-readable medium, on which is stored a computer program, which is executable by a processor, comprising:
   a program code arrangement having program code including commands for displaying a virtual view of an area surrounding a vehicle, the virtual viewing being a surround view or panoramic view, by performing the following:
   capturing a camera image of a part of the surroundings using a camera having a wide-angle lens;
   ascertaining an item of image information dependent on the captured camera image, the captured camera image being geometrically corrected; and displaying the virtual view by projecting the ascertained item of image information onto a virtual projection plane;

wherein, when ascertaining the item of image information, a resolution of the geometrically corrected camera image is increased in a first partial region using a learned machine recognition method, wherein the virtual projection plane is a bowl-shaped projection plane or a box-shaped projection plane, each of which have a flat base area, and wherein the camera image is geometrically transformed or de-skewed using a transformation matrix to obtain the geometrically corrected camera image.

18. A control unit, comprising:

at least one signal input configured to provide a first signal that represents at least one camera image captured using a camera with a wide-angle lens;

a signal output configured to output a control signal for a display device, wherein the control signal represents a virtual view of an area surrounding a vehicle, and a computing unit including a processor configured to display the virtual view of an area surrounding a vehicle, the virtual viewing being a surround view or panoramic view, wherein the computing unit is configured to perform the following:

capturing a camera image of a part of the surroundings using a camera having a wide-angle lens;

ascertaining an item of image information dependent on the captured camera image, the captured camera image being geometrically corrected; and displaying the virtual view by projecting the ascertained item of image information onto a virtual projection plane;

wherein, when ascertainment of the item of image information, a resolution of the geometrically corrected camera image is increased in a first partial region using a learned machine recognition method, wherein the virtual projection plane is a bowl-shaped projection plane or a box-shaped projection plane, each of which have a flat base area, and wherein the camera image is geometrically transformed or de-skewed using a transformation matrix to obtain the geometrically corrected camera image.

19. A vehicle, comprising:

a camera including a wide-angle lens, wherein the camera is equipped to capture at least one camera image of a part of the area surrounding the vehicle; and a control unit including:

at least one signal input configured to provide a first signal that represents the at least one camera image captured using the camera with the wide-angle lens;

a signal output configured to output a control signal for a display device, wherein the control signal represents a virtual view of an area surrounding a vehicle, and a computing unit including a processor configured to display the virtual view of an area surrounding a vehicle, the virtual viewing being a surround view or panoramic view, wherein the computing unit is configured to perform the following:

capturing the camera image of a part of the surroundings using the camera having the wide-angle lens, ascertaining an item of image information dependent on the captured camera image, the captured camera image being geometrically corrected, and displaying the virtual view by projecting the ascertained item of image information onto a virtual projection plane, wherein, when ascertainment of the item of image information, a resolution of the geometrically corrected camera image is increased in a first partial region using a learned machine recognition method, wherein the virtual projection plane is a bowl-shaped projection plane or a box-shaped projection plane, each of which have a flat base area, and wherein the camera image is geometrically transformed or de-skewed using a transformation matrix to obtain the geometrically corrected camera image.

* * * * *